United States Patent
Bauer et al.

(10) Patent No.: US 10,807,652 B2
(45) Date of Patent: Oct. 20, 2020

(54) METHOD FOR PRODUCING A LOWER PART OF A REAR SPOILER

(71) Applicant: Dr. Ing. h.c. F. Porsche Aktiengesellschaft, Stuttgart (DE)

(72) Inventors: Riccardo Bauer, Owen (DE); Tobias Posch, Wimsheim (DE)

(73) Assignee: Dr. Ing. h.c. F. Porsche Aktiengesellschaft, Stuttgart (DE)

( * ) Notice: Subject to any disclaimer, the term of this patent is extended or adjusted under 35 U.S.C. 154(b) by 0 days.

(21) Appl. No.: 16/121,691

(22) Filed: Sep. 5, 2018

(65) Prior Publication Data
US 2019/0077465 A1 Mar. 14, 2019

(30) Foreign Application Priority Data
Sep. 14, 2017 (DE) .......... 10 2017 121 403

(51) Int. Cl.
| B62D 29/00 | (2006.01) |
| B62D 29/04 | (2006.01) |
| B62D 35/00 | (2006.01) |
| B29C 70/08 | (2006.01) |
| B29C 70/68 | (2006.01) |
| B29L 31/30 | (2006.01) |

(52) U.S. Cl.
CPC .......... *B62D 29/004* (2013.01); *B29C 70/088* (2013.01); *B29C 70/68* (2013.01); *B62D 29/04* (2013.01); *B62D 35/007* (2013.01); *B29L 2031/3058* (2013.01)

(58) Field of Classification Search
CPC .... B62D 29/004; B62D 29/04; B62D 35/001; B62D 35/007; B29C 70/68; B29C 70/88; B29L 2031/3058
See application file for complete search history.

(56) References Cited

U.S. PATENT DOCUMENTS

| 10,519,993 | B2* | 12/2019 | Avalos Sartorio .... F16B 5/0088 |
| 2003/0038507 | A1* | 2/2003 | Kasahara ............. B62D 29/048 |
| | | | 296/180.1 |
| 2016/0121812 | A1* | 5/2016 | Avalos Sartorio .... F16B 47/003 |
| | | | 29/464 |
| 2016/0176460 | A1* | 6/2016 | Dietz .................... B29C 33/126 |
| | | | 428/172 |

FOREIGN PATENT DOCUMENTS

| DE | 10219495 A1 | 9/2003 |
| DE | 102009042272 A1 | 3/2011 |
| DE | 102010053960 A1 | 6/2012 |
| DE | 102015209519 A1 | 11/2016 |
| EP | 3037239 A1 | 6/2016 |

* cited by examiner

*Primary Examiner* — Bayan Salone
(74) *Attorney, Agent, or Firm* — Leydig, Voit & Mayer, Ltd.

(57) ABSTRACT

A method for producing a lower part of a rear spoiler of a motor vehicle includes providing at least one insert part and fibers, arranging the fibers and the at least one insert part in a mold, and incorporating a matrix into the mold. The method further includes molding the lower part of the rear spoiler in the mold, wherein the insert parts are laminated into the structure of the lower part, and milling the insert part after the molding of the lower part.

10 Claims, 1 Drawing Sheet

METHOD FOR PRODUCING A LOWER PART OF A REAR SPOILER

CROSS REFERENCE TO RELATED APPLICATIONS

This application claims benefit to German Patent Application No. DE 10 2017 121 403.8, filed Sep. 14, 2017, which is hereby incorporated by reference herein.

FIELD

The invention relates to a method for producing a lower part of a rear spoiler of a motor vehicle.

BACKGROUND

A component produced from a fiber composite material is known from publication EP 3 037 239 A1, said component having insert parts laminated therein, wherein the component has a plurality of laminates and the insert parts are embedded in the component during the shape-imparting method of the component.

Publication DE 10 2015 209 519 A1 discloses a structural component from a fiber composite material and metallic insert parts embedded therein, wherein the production of the structural component having the embedded insert parts is performed by a direct impact extrusion method.

A motor vehicle body component is known from DE 102 19 495 A1, said motor vehicle body component having a sheet-metal part, a support structure, and a finisher tier, wherein the support structure and the finisher tier are produced from a fiber-reinforced plastics material, and wherein the sheet-metal part, the support structure, and the finisher tier are conjointly compressed.

A light-metal construction component having a metal sheet, a reinforcement layer, and a reinforcement structure is known from publication DE 10 2009 042 272 A1, wherein the reinforcement layer and the reinforcement structure are produced from a fiber-reinforced plastics material, and wherein at least the metal sheet and the reinforcement layer are interconnected in a materially integral manner by a pressing procedure.

A body component from a fiber-composite material having insert parts embedded therein is known from DE 10 2010 053 960 A1, wherein the insert parts in the production process of the body component are incorporated into an organic sheet, and in the following method step the organic sheet and the insert parts are insert molded with a plastics material.

SUMMARY

In an embodiment, the present invention provides a method for producing a lower part of a rear spoiler of a motor vehicle. The method includes providing at least one insert part and fibers, arranging the fibers and the at least one insert part in a mold, and incorporating a matrix into the mold. The method further includes molding the lower part of the rear spoiler in the mold, wherein the at least one insert part is laminated into the structure of the lower part, and milling the at least one insert part after the molding of the lower part.

BRIEF DESCRIPTION OF THE DRAWINGS

The present invention will be described in even greater detail below based on the exemplary figures. The invention is not limited to the exemplary embodiments. All features described and/or illustrated herein can be used alone or combined in different combinations in embodiments of the invention. The features and advantages of various embodiments of the present invention will become apparent by reading the following detailed description with reference to the attached drawings which illustrate the following.

DETAILED DESCRIPTION

Embodiments of the present invention provide methods for producing a lower part of a rear spoiler of a motor vehicle, said methods enabling a reduction in components, in the weight of the lower part, and in the costs of the production of the lower part. Embodiments of the present invention further provide methods for producing a lower part of a rear spoiler of a motor vehicle, said methods enabling an improved equalization of tolerances.

According to an embodiment of the invention, a method is provided for producing a lower part of a rear spoiler of a motor vehicle. The method includes providing at least one insert part and fibers; arranging the fibers and the at least one insert part in a mold; incorporating a matrix into the mold; and molding the lower part in the mold, wherein the insert parts herein are laminated into the structure of the lower part.

According to an embodiment of the invention, the method is characterized by the further step of milling the insert part after the molding of the lower part.

According to embodiments of the invention, the production of a lower part having a reduced weight, reduced number of components, and reduced costs can be achieved. Such a lower part furthermore offers the advantage that an equalization of tolerances can be performed in a simple manner. Bearing faces which can be individually adapted to the vehicle can be readily achieved by way of methods according to embodiments of the invention.

In one preferred embodiment a depression is incorporated into the insert part by the milling.

A depression that in the cross section is circular is preferably incorporated into the insert part by the milling.

In one preferred embodiment the milling is performed in such a manner that the spacing between a surface of the insert part, obtained by the milling, and a lower side of the lower part corresponds to a predefined spacing.

The surface in the base of the depression is preferably obtained by the milling.

In one preferred embodiment the insert part is produced from a metallic material, furthermore preferably from aluminum.

The invention furthermore relates to a lower part of a rear spoiler of a motor vehicle, said lower part being produced by a method according to an embodiment of the invention.

The invention finally relates to a motor vehicle comprising at least one body component and a rear spoiler having a lower part which is produced by a method according to an embodiment the invention, wherein the lower part is fastened to the body component.

Figure 1:
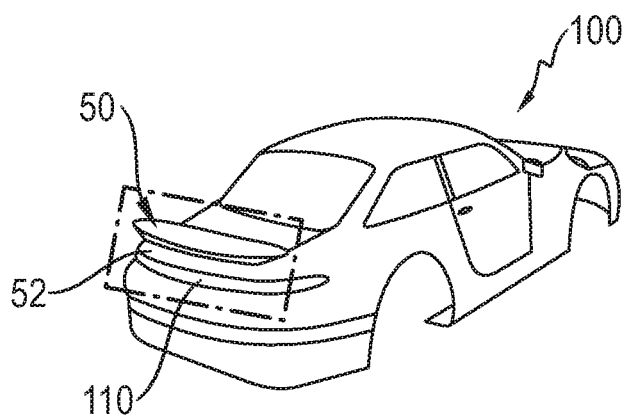
FIG. 1 shows a schematic perspective view of a motor vehicle.
Figure 2:
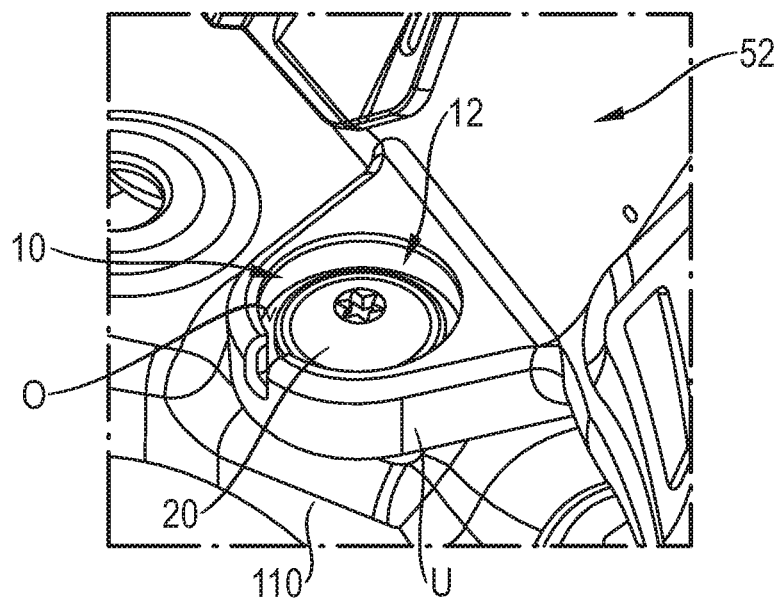
FIG. 2 shows a detailed view of a lower side of a rear spoiler of the motor vehicle depicted in FIG. 1, wherein the lower part is produced by a method according to an embodiment of the invention.
Figure 3:
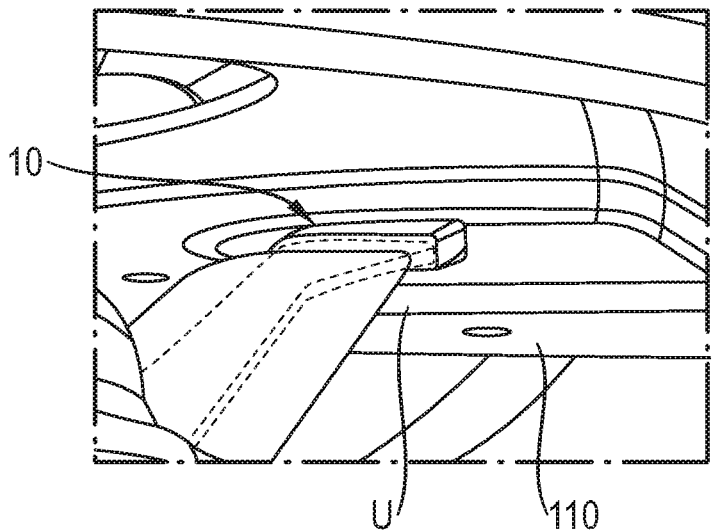
FIG. 3 shows a further fragmented view of the lower part.

FIG. 1 shows a schematic perspective view of a motor vehicle, FIG. 2 shows a detailed view of a lower side of a rear spoiler of the motor vehicle depicted in FIG. 1, wherein the lower part is produced by a method according to an embodiment of the invention, and FIG. 3 shows a further fragmented view of the lower part.

The exemplary embodiment relates to a lower part 52 of a rear spoiler 50 of a motor vehicle 100, said lower part 52 being produced by a production method according to an embodiment of the invention. The lower part 52 is capable of being fastened to a body component 110 of the motor vehicle 100.

The lower part 52 comprises a lower side U which in an installed position according to the intended use of the rear spoiler 52 bears on a bearing face of the body component 110. The lower part 52 of the rear spoiler 50 is fastened to the body component 110 by means of a screw 20.

The lower part 52 has at least one insert part 10, wherein the screw 20 is guided in an opening of the insert part 10. This is derived in particular from FIG. 2. The lower part 52 can comprise a plurality of such insert parts 10. The insert part 10 can be produced from a metallic material, in particular from aluminum.

The lower part 52 according to the exemplary embodiment is produced by the production method according to an embodiment of the invention which comprises the following method steps: providing at least one insert part 10 and fibers; arranging the fibers and the at least one insert part 10 in a mold; incorporating a matrix into the mold; molding the lower part 52 in the mold, wherein the insert parts 10 herein are laminated into the structure of the lower part 52; milling the insert part 10 after the molding of the lower part 52.

A depression 12 is preferably incorporated into the insert part 10 by the milling. The depression 12 herein can serve for receiving a head of the screw 20.

A depression 12 that in the cross section is circular is furthermore preferably incorporated into the insert part 10 by the milling.

The milling is preferably performed in such a manner that the spacing between a surface O of the insert part 10, obtained by the milling, and a lower side U of the lower part 52 corresponds to a predefined spacing.

The surface O in the base of the depression 12 is preferably obtained by the milling.

The insert part 10 can be produced from a metallic material, preferably from aluminum.

While the invention has been illustrated and described in detail in the drawings and foregoing description, such illustration and description are to be considered illustrative or exemplary and not restrictive. It will be understood that changes and modifications may be made by those of ordinary skill within the scope of the following claims. In particular, the present invention covers further embodiments with any combination of features from different embodiments described above and below.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

What is claimed is:

1. A method for producing a lower part of a rear spoiler of a motor vehicle, the method comprising:
   providing at least one insert part and fibers;
   arranging the fibers and the at least one insert part in a mold;
   incorporating a matrix into the mold;
   molding the lower part of the rear spoiler in the mold, wherein the at least one insert part is laminated into the structure of the lower part such that the fibers and the molded matrix surround at least an entire lateral periphery of the insert part; and
   milling the at least one insert part after the molding of the lower part, the at least one insert part having an opening configured to guide and accept a fastener for attaching the lower part of the rear spoiler to the motor vehicle.

2. The method as claimed in claim 1, wherein a depression is incorporated into the at least one insert part by the milling.

3. The method as claimed in claim 2, wherein a depression that in the cross section is circular is incorporated into the at least one insert part by the milling.

4. The method as claimed in claim 1, wherein the milling is performed in such a manner that the spacing between a surface of the at least one insert part, obtained by the milling, and a lower side of the lower part corresponds to a predefined spacing.

5. The method as claimed in claim 3, wherein a surface in a base of the depression is obtained by the milling.

6. The method as claimed in claim 1, wherein the at least one insert part is produced from a metallic material.

7. A lower part of a rear spoiler of a motor vehicle, wherein the lower part is produced by a method as claimed in claim 1.

8. A motor vehicle comprising at least one body component and a rear spoiler having a lower part as claimed in claim 7, wherein the lower part is fastened to the body component by the fastener, which passes through the opening.

9. The method as claimed in claim 6, wherein the metallic material is aluminum.

10. The method as claimed in claim 1, wherein the arranging of the fibers and the at least one insert part in the mold comprises arranging a plurality of insert parts spaced apart from each other,
   wherein during the molding of the lower part of the rear spoiler in the mold, the plurality of inserts parts are laminated into the structure of the lower part, and
   wherein the milling of the at least one insert part after the molding of the lower part comprises milling the plurality of insert parts, each of the insert parts having their respective opening configured to guide and accept the respective fastener for attaching the lower part of the rear spoiler to the motor vehicle.

\* \* \* \* \*